Figure 1:
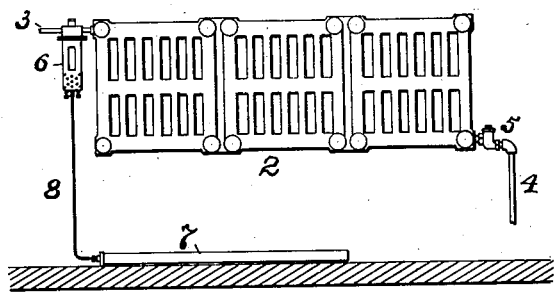

I. L. FITTS.
THERMOSTATIC CONTROL DEVICE.
APPLICATION FILED OCT. 26, 1916.

1,347,689.

Patented July 27, 1920.

Witness
Daniel Webster Jr.
E. W. Smith.

Inventor
James Logan Fitts
By
Attorney

UNITED STATES PATENT OFFICE.

JAMES LOGAN FITTS, OF PENSAUKEN TOWNSHIP, CAMDEN COUNTY, NEW JERSEY, ASSIGNOR TO WARREN WEBSTER & COMPANY, A CORPORATION OF NEW JERSEY.

THERMOSTATIC CONTROL DEVICE.

1,347,689.   Specification of Letters Patent.   Patented July 27, 1920.

Application filed October 26, 1916. Serial No. 127,780.

*To all whom it may concern:*

Be it known that I, JAMES LOGAN FITTS, a citizen of the United States, and resident of Pensauken township, county of Camden, and State of New Jersey, have invented an Improvement in Thermostatic Control Devices, of which the following is a specification.

The object of my invention is to provide a reliable and efficient thermostatic device by which the change in volume of a liquid influenced by changes in temperature may be used to produce mechanical movement in suitably arranged instrumentalities for operating suitable control devices, including valves, for controlling the supply of a heating or other medium.

More particularly, the object of my invention is to provide a device which may be applied to the radiators of a steam heating system so that the temperature in a room or compartment may be maintained substantially constant by admitting steam to the radiators when the room temperature has fallen below a predetermined given degree and by decreasing the supply when the temperature has risen above the said predetermined degree.

Thermostatic control has commonly been done by employment of expansible vessels containing a vapor or gas and air, or combinations of these with a volatile liquid, but the pressure due to volatilization by increase in temperature, unless confined in a small space and operating against an extended area, is slight and insufficient to overcome the internal friction of the working parts such as stuffing-boxes, levers, etc., and also the variable pressures of the fluids (such as steam) desired to control. In the present invention I utilize the expansion of a large volume of liquid which entirely fills the thermostatic vessel, expansible vessels of the motor device and the capillary duct connecting them, and while the expansion of the liquid is much less than a vapor per degree of change in temperature, yet the force exerted is relatively great due to the slight compressibility of liquids. The utilization of this expansion upon small temperature changes may be made to do useful work by using a relatively large volume of the liquid led through a capillary duct to and acting upon elastic or expansible vessels so constructed to give maximum movement when so operated, but in so doing provision must be made to relieve the expansible vessel from undue strain when its maximum movement for useful work has taken place.

My invention consists of certain improvements in thermostatic control devices whereby the above objects are attained, said improvements comprising certain organization and combination of parts which are fully described hereinafter and more particularly defined in the claims.

For the purpose of illustrating my invention, I have shown in the accompanying drawings the form thereof which is at present preferred by me, since the same is arranged to give satisfactory and reliable results, but it is to be understood that the several instrumentalities, of which my invention consists, can be variously arranged and organized and that my invention is not limited to the precise arrangement and organization of these instrumentalities as herein shown and described.

Figure 2:
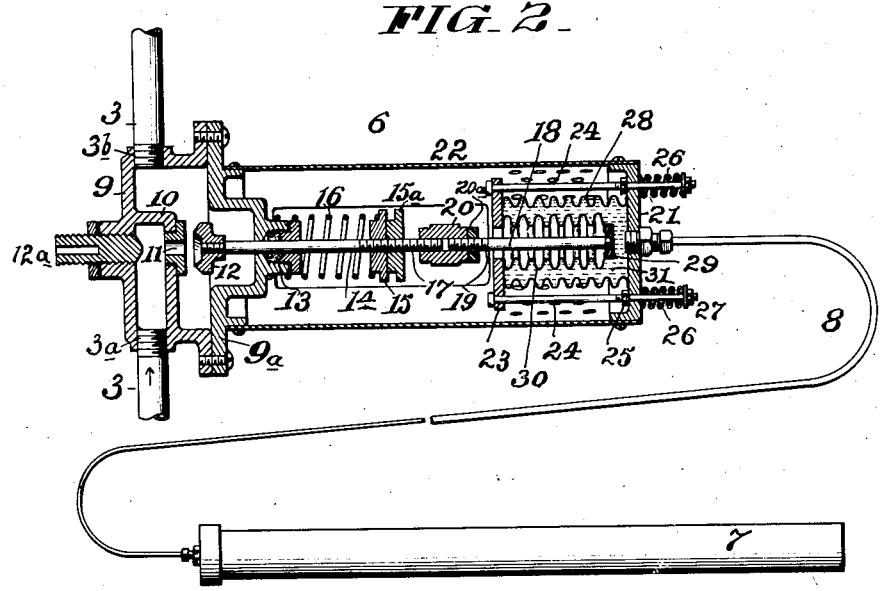
Figure 3:
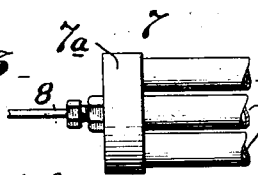

Referring to the drawings:—Figure 1 represents in elevation a wall type of steam heating radiator with my invention applied thereto; Fig. 2 illustrates the thermostatic control device in section; and Fig. 3 is a detail view of a modified form of vessel used for containing the expansible liquid and which is subjected to the temperature changes.

In Fig. 1, is shown a wall radiator 2 arranged at a distance above the floor and having a steam pipe 3 for supplying steam thereto, preferably at the top, and also having a return pipe 4 provided with any usual type of return valve 5, which permits the passage of air and water but restricts the passage of steam. Associated with such radiator are my improved devices for automatically controlling the supply of steam, whereby the room temperature may be maintained substantially constant, said devices comprising a motor operated valve 6 for controlling the steam, a thermostatic vessel or volume 7 arranged close to the floor preferably below the radiator, and a connecting tube 8 of small diameter between the vessel 7 and the motor 6, said vessel 7, pipe 8 and motor 6 containing an expansible liquid whose expansion and contraction supply the motive power for operating the motor.

In this arrangement of parts, the thermostatic vessel 7 is located in such position that the cooler air of the room passes over it before rising to the radiator, hence the said air, affecting the thermostatic vessel and its contents, has an average temperature of the room and insures a proper responsive action in the regulation of the radiator temperature. It is manifest that, while I have shown my invention as applied to a wall radiator, it may be employed with any type of radiator or heating means or for other use, and therefore the present example is by way of illustration only, the invention not being confined to steam heating, *per se*.

I will now consider the motor device 6 which is thermostatically operated. In general, it consists of a thermostatically operable expansible vessel which contains an expansible fluid, the expansible vessel arranged to operate a control piece such as a valve by which the regulation may be effected, the expansible vessel being opposed in its motor action by mechanical means such as spring devices under the influence of which the valve or other control piece is normally operated to insure the operative condition of the apparatus to be controlled or regulated. In the particular example illustrated, I have shown the motor device as adapted to control a valve of a thoroughfare through which steam or other fluid may pass.

9 is a valve body with an intake steam pipe port $3^a$ and outlet port $3^b$ and providing a thoroughfare through which steam will freely pass when the valve is open. 10 is a partition in the body through which is an opening or valve seat 11 controlled on the steam inlet side by the stop valve $12^a$ which may be used to shut steam off permanently or for repairs, and on the opposite side providing a seat for the regulating valve piece 12. The latter is annular and has its contacting portion V-shaped in cross section, forming a sharp annular knife edge to bear against the flat surface of the valve seat about the opening, reducing to a marked degree leakage which occurs through the valve caused by accumulations of dirt between the valve and its seat. The knife-edge of the valve piece will cut into the dirt and release it, and at the same time enable the valve piece to better seat itself. $9^a$ represents a cover or bonnet for the valve body, suitably secured to the same, and is provided with a stuffing-box 13 through which the valve stem 14 passes.

14 is the stem carrying the valve piece and is threaded at its outer end and upon which is screwed a nut 15 and lock nut $15^a$ which serve to receive the thrust of a spring 16 arranged between the valve cover and the nut. It will thus be seen that the action of the spring is to normally force the valve piece 12 away from its seat, to cause the valve to open, and that the tension of this spring may be adjusted by turning the nut 15 upon the stem 14. The stem 14 is connected to a stem extension 18 by a threaded coupling sleeve 20, having a lock nut $20^a$, which engages a left-hand thread 19 cut on stem extension 18. By adjusting the sleeve 20, the total length of the rod structure 14—19 may be changed and thus necessitate a greater or less temperature rise to close the valve.

A suitable casing 22 is secured to the valve bonnet and carries at its outer end a head 21 which forms a fixed support for the motor element, consisting of a corrugated or bellows-shaped metallic cylindrical casing 28 hermetically secured to the head 21 and having affixed at its other or inner end in a liquid-tight manner a movable annular head 23. The annular head 23 is held at a fixed distance from the main head 21 by a plurality of members, formed of bolts 24 extending through the head 21 and carrying nuts or collars 25 which bear against the head to limit the outward effect of spring 26 in collapsing the vessel 28. Movement of the annular head 23 away from the main head 21 is retarded by springs 26 which are of greater strength relative to spring 16 and are held on the rods 24 by the washers and nuts 27. Within the outer casing 28 is a smaller corrugated or bellows-shaped metallic casing 30, one end of which is secured to the annular head 23 by a liquid-tight joint, and the other end of which is fastened to a piston piece 29 on the end of the stem extension rod 18. The vessel or space 31, thus formed within the outer casing 28 and between it and the inner casing 30, confines the expansible liquid, the same being introduced by a capillary tube 8 leading from the thermostatic volume or vessel 7, relatively much greater than the volume of the vessel 31, in order that a sufficient amount of liquid may be forced up the capillary tube to move the piston head 29. It will be noted that the area of this piston head is small compared with the cross sectional area of the vessel 31, and as the movement of the valve is small, but little increase of the liquid in vessel 31 is required to cause this movement.

The vessel 7 may be one single unit as shown in Fig. 2, or it may be composed of several units to increase the exposed surfaces, as shown in Fig. 3, wherein the tubes $7^b$ are joined by a header $7^a$ into which leads the capillary tube 8. This vessel 7 may be made in any suitable manner or of any shape desired and found suitable for the purpose intended.

The operation of the device is as follows:—Assume the vessel 31, the tube 8 and the vessel 7 to be filled with the expansible liquid and that the temperature adjacent to the vessel 7 is below that degree where it is desired that the device shall operate. The valve piece 12 will be normally away from its seat 11 and the valve will be open admitting steam to the radiator. An increase of temperature at the thermostatic vessel 7 causes the liquid therein to expand and flow through the capillary duct 8 into the motor vessel 31 increasing the pressure therein. This increased pressure, acting on the piston head 29 drives it outward against the resistance of the inner bellows casing 30, and also against the resistance of the spring 16. With a sufficient rise of temperature, the movement of the piston head 29 closes the valve and shuts off the steam, consequently further movement of the piston head 29 is stopped. Means must now be provided to take care of any further increase in temperature, as otherwise the tremendous pressure exerted by the further expansion of the thermostatic liquid would burst the vessel 31. When piston head 29 reaches its limit of travel, any further expansion of the liquid acts on the annular head 23 to expand the outer casing 28 and compress the springs 26. During this expansion of the casing 28 there is also an expansion of the casing 30 and the capacity of the vessel becomes greater to receive the liquid. The force required to overcome these springs is so much greater than the force required for the closing of the valve that in normal operation the head 23 may be considered as temporarily fixed.

When the temperature decreases, the springs 26 and the elasticity of the casings 28 and 30 draw the annular head 23 back to its normal position shown. Any further decrease of temperature allows the spring 16 to expand the casing 30 and open the valve to admit steam to the radiator and thus cause a rise in its temperature and that of the air passing over it.

I do not confine myself to any particular liquid to be employed, but alcohol is most desirable because of its relatively large coefficient of expansion. In using the liquid, great care must be taken that all gas or vapor shall be expelled when filling the apparatus.

While the liquid in the expansible chamber or vessel 31 of the motor device will be affected by temperature variations coincidentally with the expansion and contraction of the liquid within the volume or vessel 31, these changes will be due to such a relatively smaller quantity of liquid that they will not be the governing element, and hence the regulation will be essentially dependent upon the temperature changes of the liquid in the thermostatic volume or vessel 7 itself. For same reasons the temperature variations in the liquid in the capillary tube or duct 8 have no appreciable governing influence on the apparatus, its cubical content being entirely too small relatively to that of the vessel 7.

The chief feature of this thermostatic control device is the employment of the expansion of a relatively large volume of a liquid to produce pressure to move a mechanical element. The use of a liquid as the expansible medium means that the pressure exerted will be great and that therefore the moving element can be of strong construction, its action will be positive, and the adjustment or setting to insure the temperature regulation may be accurately made. In devices employing a gas or a combination of a gas and a volatile liquid as the expansible medium, much less pressure is produced by a given temperature change, and this means that the device must be of light construction and very sensitive, and hence that its action will be more or less uncertain.

The fact that in the invention described above, the body of the liquid which is subjected to the temperature variations may be located at a distance from the moving or motor element, means that a large volume of liquid may be employed, and consequently small changes in temperature will produce a large increase in pressure.

I have described my invention as more especially applying to the regulation of the steam supply for radiators, but that is by way of example only, as the apparatus may be employed for any purpose where regulation is required commensurate with temperature changes of an atmosphere or medium surrounding the thermostatic vessel 7; and it will also be apparent that such regulation may be by operation of a valve to control a fluid or otherwise, I in no wise limiting my invention in this respect.

It will now be apparent that I have devised a novel and useful construction which embodies the features of advantage enumerated as desirable in the statement of the invention and the above description, and while I have in the present instance shown and described the preferred embodiment thereof which is best suited to give satisfactory and reliable results in practice, it is to be understood that the same is susceptible of modification in various particulars without departing from the spirit or scope of the invention or sacrificing any of its advantages.

Having now described my invention, what I claim as new and desire to secure by Letters Patent, is:—

1. In a device of the character stated, the combination of a thermostatic vessel and motor device having an expansible chamber connected to the thermostatic vessel by a capillary tube, the interior of the thermostatic vessel, tube and expansible chamber filled with an expansible fluid, said motor device comprising two bellows members of different diameters and arranged one within the other, said bellows members connected at one end and separately closed and relatively movable at their other ends, the space between the bellows members forming a liquid holding chamber in communication with the capillary tube, a valve device having its valve piece connected with the movable end of the inner bellows a rigid connection between the valve device and the said other end of the outer bellows whereby it is held against movement, spring devices for permitting the expansion of the outer bellows, and means to limit the contraction of said outer bellows.

2. In a device of the character stated, the combination of a thermostatic vessel and motor device having an expansible chamber connected to the thermostatic vessel by a capillary tube, the interior of the thermostatic vessel, tube and expansible chamber filled with an expansible fluid said motor device comprising two bellows members of different diameters and arranged one within the other, said bellows members connected at one end and separately closed and relatively movable at their other ends, the space between the bellows members forming a liquid holding chamber in communication with the capillary tube, a valve device having its valve piece connected with the movable end of the inner bellows, a rigid connection between the valve device and the said other end of the outer bellows whereby it is held against movement, spring devices for permitting the expansion of the outer bellows, a spring to oppose the action of the inner bellows in closing the valve device, and means to adjust the tension of the spring.

3. In a device of the character stated, the combination of a liquid-tight thermostatic vessel, a pressure motor having a liquid-tight expansible chamber located at a distance from the thermostatic vessel and provided with an independently movable part arranged within it and said expansible chamber and inner movable part expansible in opposite directions, a capillary duct having one end in communication with the interior of the thermostatic vessel and the other end in communication with the interior of the expansible chamber of the pressure motor, said vessel, chamber and duct completely filled with an expansible liquid, means operable by compression of the movable part in one direction, mechanical means to hold the expansible chamber against expansion in the direction of the expansion of the movable part until a pressure in excess of the motor requirements is formed within the expansible chamber and then release it to avoid abnormal pressure therein, and means to actuate the movable part of the expansible chamber in opposition to the action of the expansible liquid, whereby the variations in the temperature surrounding the thermostatic vessel vary the operations of the motor and the means actuated thereby.

4. In a device of the character stated, the combination of a liquid-tight thermostatic vessel, a pressure motor having a liquid-tight expansible chamber located at a distance from the thermostatic vessel and provided with an independently expansible part arranged within it and said expansible chamber and inner movable part expansible in opposite directions, a capillary duct having one end in communication with the interior of the thermostatic vessel and the other end in communication with the interior of the expansible chamber of the pressure motor, said vessel, chamber and duct completely filled with an expansible liquid, means operable by compression of the movable part in one direction, mechanical means to hold the expansible chamber against expansion in the direction of the expansion of the inner expansible part until a pressure in excess of the motor requirements is formed within the expansible chamber and then release it to avoid abnormal pressure therein, means continually operating to actuate the movable inner expansible part of the expansible chamber in opposition to the action of the expansible liquid, and adjustable means for varying the extent of opposition to the action of the expansible liquid, whereby the variations in the temperature surrounding the thermostatic vessel vary the operations of the motor and the means actuated thereby.

5. In a device of the character stated, the combination of a liquid-tight thermostatic vessel, a pressure motor comprising a single liquid-tight chamber having outer and inner concentric expansible casing members normally independently expansible in opposite directions, spring means for preventing the expansibility of the outer casing alone until a predetermined pressure is exceeded, movable means actuated by the inner casing only, means to resist the movement of the movable means after a given movement while permitting the expansion of the expansible casing members, and a tubular connection between the interior of the thermostatic vessel and chamber of the motor between the concentric members, said vessel, chamber and tubular connection full of an expansible liquid, whereby when a full collapsing movement of the inner casing is had an expansion movement thereof is provided by expansion of the outer casing.

6. In a device of the character stated, the combination of a liquid-tight thermostatic vessel, a pressure motor comprising a single liquid-tight chamber having concentric outer and inner expansible casing members normally independently expansible in opposite directions, spring means for preventing the expansibility of the outer casing alone until the inner casing has collapsed and a predetermined pressure is exceeded, movable means actuated by the inner casing, means to resist the movement of the movable means after a given movement, an adjustable spring to oppose the movement of the inner casing, and a tubular connection between the interior of the thermostatic vessel and chamber of the motor between the concentric casing members, said vessel, chamber and tubular connection full of an expansible liquid, whereby when a full collapsing movement of the inner casing is had an expansion movement thereof is provided by expansion of the outer casing.

7. In a device of the character stated the combination of a valve having a movable valve piece, with two expansible vessels having an expansion chamber between them, one of the expansible vessels connected to and moving the valve piece under action of the pressure within the chamber and capable of expanding in the act of holding the valve piece closed, a thermostatic vessel for providing an expansible fluid for the chamber between the expansible vessels, and means acting upon the other of the expansible vessels to normally hold it against expansion until a predetermined pressure in the chamber is reached and thereafter permit it to expand simultaneously with the expansible vessel connected to the valve piece to prevent an abnormal increase in the pressure upon the valve seat.

8. In a device of the character stated, the combination of a liquid-tight thermostatic vessel, with a liquid-tight motor chamber having a movable part and comprising two expansible elements one operable at one end in response to an increase of pressure up to a predetermined pressure and at both ends beyond said predetermined pressure and the other operable only in response to a pressure in excess of the predetermined pressure, a capillary tube joining the thermostatic vessel and the motor chamber said motor chamber, thermostatic vessel and capillary tube completely filled with an expansible liquid, means for varying the temperature of the medium affecting the thermostatic vessel, and means actuated by the movable part of the motor chamber under the pressure less than the predetermined pressure to control the temperature of said medium.

9. In a device of the character stated, the combination of a liquid-tight thermostatic vessel, with a liquid-tight motor chamber having a movable part said motor chamber comprising an inner bellows member having a movable part and operable at one end in response to an increased pressure up to a predetermined pressure and at both ends beyond said predetermined pressure and an outer bellows member supporting the inner bellows member and moving in response to a pressure in excess of the predetermined pressure, means for returning both bellows to their normal conditions after being actuated, a capillary tube joining the thermostatic vessel and the motor chamber said motor chamber, thermostatic vessel and capillary tube completely filled with an expansible liquid, means for varying the temperature of the medium affecting the thermostatic vessel, and means actuated by the movable part of the motor chamber under the pressure less than the predetermined pressure to control the temperature of said medium.

10. In a device of the character stated, the combination of a liquid-tight thermostatic vessel comprising a plurality of tubular chambers in communication to expose large areas, with a liquid-tight motor chamber having a movable part and comprising two expansible elements connected together, one operable by compression in response to an increase of pressure up to a predetermined pressure and the other operable by expansion only in response to a pressure in excess of the predetermined pressure, a capillary tube joining the thermostatic vessel and the motor chamber said motor chamber, thermostatic vessel and capillary tube completely filled with an expansible liquid, means for varying the temperature of the medium affecting the thermostatic vessel, and means actuated by the movable part of the motor chamber under the pressure less than the predetermined pressure to control the temperature of said medium.

11. In a device of the character stated, the combination of a thermostatic vessel, a motor device having an expansible chamber, a capillary tube connecting the interior of the thermostatic vessel with the interior of the expansible chamber of the motor device, said thermostatic vessel, expansible chamber of the motor device and the capillary tube filled with an expansible fluid, and said motor device comprising two bellows members arranged one within the other and connected at one end and having the opposite ends independently closed to form a space between the inside of one of the bellows members and the outside of the other of the bellows members, a rod connected with the closed end of one of the bellows, a spring for actuating the rod in opposition to the bellows when subjected to the expansion of the liquid in the chamber of the motor device, and yielding means for permitting the expansion of the other of the bellows when said expansion exceeds a predetermined limit.

12. In a device of the character stated, the combination of a thermostatic vessel, a motor device having an expansible chamber, a capillary tube connecting the interior of the thermostatic vessel with the interior of the expansible chamber of the motor device, said thermostatic vessel, expansible chamber of the motor device and the capillary tube filled with an expansible fluid, and said motor device comprising two bellows members connected at one end and having the opposite ends independently closed to form a space between the bellows, a rod connected with the closed end of one of the bellows, a spring for actuating the rod in opposition to the bellows when subjected to the expansion of the liquid in the chamber of the motor device, and yielding means for permitting the expansion of the other of the bellows when said expansion exceeds a predetermined limit comprising rods connected with the ends of the bellows which are joined, means to limit the movement of the rods in one direction to prevent undue collapsing of the bellows, and spring devices of greater strength than the first mentioned spring devices for permitting the expansion of the bellows only under a pressure in excess of the predetermined pressure.

13. In a device of the character stated, the combination of a thermostatic vessel, a motor device having an expansible chamber, a capillary tube connecting the interior of the thermostatic vessel with the interior of the expansible chamber of the motor device, said thermostatic vessel, expansible chamber of the motor device and the capillary tube filled with an expansible fluid, and said motor device comprising two bellows members connected at one end and having the opposite ends independently closed to form a space between the bellows, a rod connected with the closed end of one of the bellows, a spring for actuating the rod in opposition to the bellows when subjected to the expansion of the liquid in the chamber of the motor device, means to adjust the tension of the spring, and yielding means for permitting the expansion of both of the bellows when said expansion of the liquid exceeds a predetermined limit.

14. In a device of the character stated, the combination of a thermostatic vessel, a motor device having an expansible chamber, a capillary tube connecting the interior of the thermostatic vessel with the interior of the expansible chamber of the motor device, said thermostatic vessel, expansible chamber of the motor device and the capillary tube filled with an expansible fluid, and said motor device comprising two bellows members connected at one end and having the opposite ends independently closed to form a space between the bellows, a rod connected with the closed end of one of the bellows, a spring for actuating the rod in opposition to the bellows when subjected to the expansion of the liquid in the chamber of the motor device, yielding means for permitting the expansion of both of the bellows when said expansion exceeds a predetermined limit, a valve body, a valve piece operated by the rod, and means for adjusting the length of the rod.

15. In a device of the character stated, the combination of a thermostatic vessel, an expansible motor having a chamber, a capillary duct between the motor chamber and the thermostatic vessel, said vessel, duct and chamber being entirely full of an expansible liquid, the said motor comprising two bellows of different diameter one arranged within the other and united at one end and said bellows having their opposite ends respectively independently sealed and forming a space within the outer bellows and about the inner bellows, an operating rod extending through and connected with the closed movable end of the inner bellows and adapted for imparting motion, and means for limiting the collapsing of the outer bellows but permitting its expansion beyond a predetermined pressure.

16. In a device of the character stated, the combination of a thermostatic vessel, an expansible motor having a chamber, a capillary duct between the motor chamber and the thermostatic vessel, said vessel, duct and chamber being entirely full of an expansible liquid, the said motor comprising two bellows of different diameter one arranged within the other and said bellows united at the corresponding ends and having their other ends respectively independently sealed and forming a space within the outer bellows and about the inner bellows, an operating rod extending through and connected with the closed end of the inner bellows and adapted for imparting motion, and separate means for limiting the collapsing of the outer bellows but permitting its expansion beyond a predetermined pressure, said means comprising rods connected with the movable end of the outer bellows and extending through an extension of the closed end thereof said rods provided with shouldered portions on one side of said extension of the closed end to limit their movement through said end to prevent undue collapsing of the bellows, and springs on the other side of the extension of the closed end for holding the rods against longitudinal movement by the expansion of the bellows until a predetermined pressure in excess of that of the springs is exerted by the expansible liquid.

In testimony of which invention I hereunto set my hand.

JAMES LOGAN FITTS.

Witnesses:
 PHILIP Y. QUINN,
 F. JOSEPH MILLER.